United States Patent [19]
Zehnpfennig

[11] 3,818,498
[45] June 18, 1974

[54] COMPACT CAMERA WITH HIGHLY FOLDED OPTICAL SYSTEM

[75] Inventor: Theodore F. Zehnpfennig, Wayland, Mass.

[73] Assignee: Visidyne, Inc., Burlington, Mass.

[22] Filed: Jan. 15, 1973

[21] Appl. No.: 323,756

[52] U.S. Cl. .............................................. 354/150
[51] Int. Cl. ............................................ G03b 17/17
[58] Field of Search ........................... 95/11, 18 P

[56] References Cited
UNITED STATES PATENTS
2,045,093   6/1936   Newcomer .................. 95/18 P

*Primary Examiner*—John M. Horan
*Attorney, Agent, or Firm*—Joseph S. Iandiorio

[57] ABSTRACT

A compact camera having a highly folded optical system including, first reflecting means; second reflecting means disposed at a first angle to the first reflecting means, one of the first and second reflecting means being partially reflective, the film plane of the camera being proximate the one of the reflecting means which is partially reflective; means for directing radiation from an object to be photographed to one of the reflecting means at a second angle to produce multiple reflections between the first and second reflecting means; and selecting means proximate the one of the reflecting means which is partially reflecting for selecting radiation subject to a predetermined number of reflections for exposing film in the film plane.

9 Claims, 7 Drawing Figures

3,818,498

COMPACT CAMERA WITH HIGHLY FOLDED OPTICAL SYSTEM

FIELD OF THE INVENTION

This invention relates to a compact camera and more particularly to such a camera using two reflective elements to produce multiple reflections for folding the optical path.

BACKGROUND OF INVENTION

Camera manufacturers are putting considerable effort into miniaturizing the camera film systems intended for sale to the general public. One example is Kodak's "Pocket Instamatic" camera, which achieves compactness by using a small film format and a short focal length lens. The resulting pictures are increased to a size acceptable to the consumer by an enlarging step during the printing process. This procedure cannot, however, be usefully adapted to the field of "instant" photography such as applied in Polaroid cameras because, in such cameras the negative and the print are the same size and both are contained within the same film cassette. Miniaturizing the negative would be pointless if the overall dimensions of the camera were still determined by the size of the format of the print. Efforts to miniaturize such cameras has resulted in a smaller camera which apparently achieves the "pocket size" compactness by a complex mechanical folding scheme. To take a picture, the user must unfold the device. In the unfolded mode, the camera is apparently not much smaller than an old box-type camera.

SUMMARY OF INVENTION

It is therefore an object of this invention to provide a compact camera using a highly folded optical system between the lens and film plane to reduce the space required to accommodate the optical path.

It is a further object of this invention to provide such a camera which achieves the reduced "pocket size" dimensions without resort to mechanical folding arrangements.

It is a further object of this invention to produce such a camera which achieves the reduced "pocket size" dimensions without seriously detracting from the operation of the optical system or the size of the image.

It is a further object of this invention to provide such a camera which achieves the reduced "pocket size" dimensions while retaining the same size film format.

It is a further object of this invention to provide such a camera which achieves the reduced "pocket size" dimensions without seriously detracting from the operation of the optical system and which is particularly suited for use in "instant" photography.

The invention results from the realization that a compact camera which achieves a reduced size without seriously detracting from the operation of the optical system, the size of the image or the film format and without resort to mechanical folding arrangements may be achieved using a highly folded optical system using two reflective elements to produce multiple reflections for folding the optical path. The invention features a compact camera having a highly folded optical system. The highly folded optical system includes a first reflecting means and second reflecting means disposed at a first angle to the first reflecting means. One of the first and second reflecting means is partially reflective; the film plane of the camera is proximate the one of the reflecting means which is partially reflective. There is means for directing radiation from an object to be photographed to one of the reflective means at a second angle to produce multiple reflections between the first and second reflecting means. Selecting means proximate the one of the reflecting means which is partially reflective selects the radiation subject to a predetermined number of reflections for exposing the film at the film plane.

DISCLOSURE OF PREFERRED EMBODIMENT

Other objects, features and advantages will occur from the following description of a preferred embodiment and the accompanying drawings, in which.

The invention may be accomplished using a camera in which the optical path is folded between the lens and the image plane of the film by multiple reflections between two reflecting means such as mirrors, one of which is partially reflective. After a predetermined desired number of reflections have occurred, rays of radiation having undergone that number of reflections and only those rays of radiation passing through the partially reflecting mirror will be permitted to pass through the selection means to create a photographic pattern or image on the film or other radiation sensing medium. The arrangement of the two reflecting means and the angle at which the radiation from the object is projected on one of the reflecting means are set so that the image plane coincides with the film plane of the photographic film.

Figure 1:
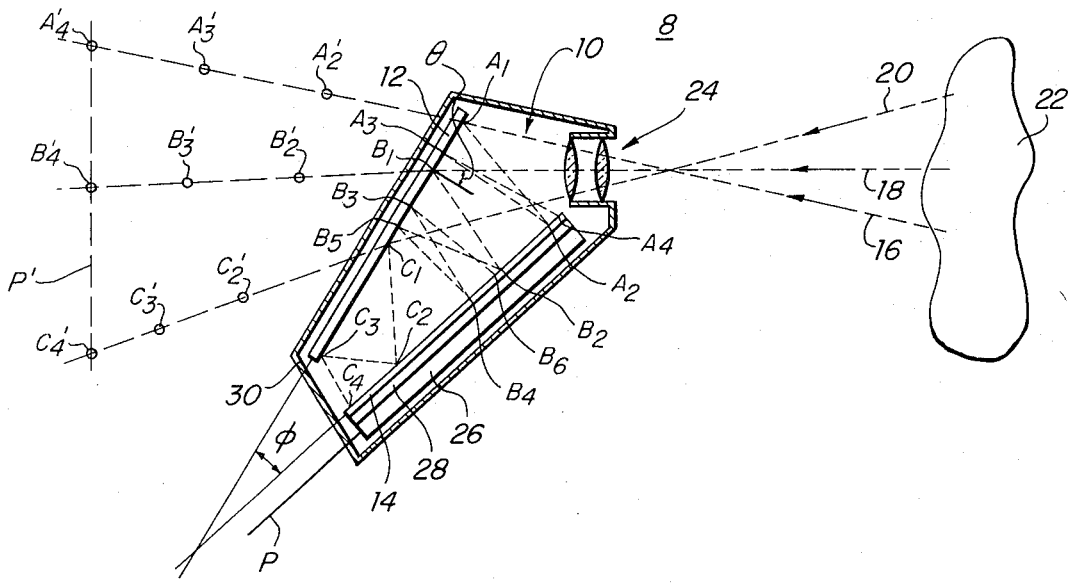
FIG. 1 is a diagrammatic, side elevational view showing the essential parts of a camera according to this invention and omitting conventional camera components.

There is shown in FIG. 1 a camera 8 having a highly folded optical system 10 according to this invention including a highly reflective means, mirror 12 and a partially reflective means 14 disposed at an angle $\phi$ to mirror 12. Radiation rays 16, 18, 20, from an object 22 to be photographed is directed at an angle to one of mirrors 12, 14, e.g. at angle $\theta$ to mirror 12 as shown, by lens 24. Typically, as shown, lens 22 is a compound lens. A virtual image is formed at plane P′, while the real image occurs at plane P at mirror 14. Mirrors 12, 14 are spaced apart a predetermined distance at an angle $\phi$ relative to angle $\theta$ such that after a predetermined number of reflections the plane P is effectively at mirror 14. The relationship between $\phi$ and $\theta$ may be expressed as: $\theta = n\phi$ where $n$ is the number of reflections a ray undergoes before leaving system 10. In FIG. 1, $n$ is three. Ray 16 reflects at $A_1$ and at $A_2$ and $A_3$, corresponding to points $A'_2$, $A'_3$ to reach $A_4$ at plane P, corresponding to $A'_4$ at P'. Similarly, ray 18 reflects at $B_1$ and at $B_2$ and $B_3$, corresponding to points $B'_2$, $B'_3$, to reach $B_4$ at plane P, corresponding to $B'_4$ at P', and ray 20 reflects at $C_1$ and at $C_2$ and $C_3$, corresponding to points $C'_2$ and $C'_3$, to reach $C_4$ at plane P, corresponding to $C'_4$ at P'.

An image of object 22 is thereby formed at plane P at mirror 14 by rays 16, 18, 20 escaping mirror 14 at $A_4$, $B_4$, $C_4$. Other spurious images are also formed by those rays escaping through mirror 14 at lowered number reflections, i.e. at points $A_2$, $B_2$, $C_2$ and higher numbered reflections, i.e. at point $B_6$, but these are not formed at plane P.

However, before the radiation can reach the film 26 it must pass through some means for selection 28 which block or absorb all the radiation except that which has undergone the proper number of reflections. Selection means 28 may be provided in the form of a lenticular screen with appropriately placed apertures or a mechanical collimator as shown more specifically in FIG. 2, infra, or other appropriate selection means.

In FIG. 1 the highly folded optical system 10, lens 24, film 26, and selection means 28 are shown encased in a housing 30 which is approximately the same size in the height and width dimensions as the format of film 26; the depth of camera housing 30 is determined by the spacing between mirrors 12 and 14. Camera 8 would typically require other conventional camera components such as a shutter, a view finder, a focus adjustment, an aperture adjustment, a film transport, etc., which have been omitted for clarity. Advantageously film 26 may be a film pack such as sold by the Polaroid Corporation for use in taking "instant" pictures in which case the mounting and roller assembly found in a conventional Polaroid Land Camera would be used.

The partially reflecting means may be a plate with a beam splitting coating or a highly reflecting member containing a multiplicity of tiny holes which function to transmit a certain percentage of the radiation just as does the beam splitting coating.

Figure 2:
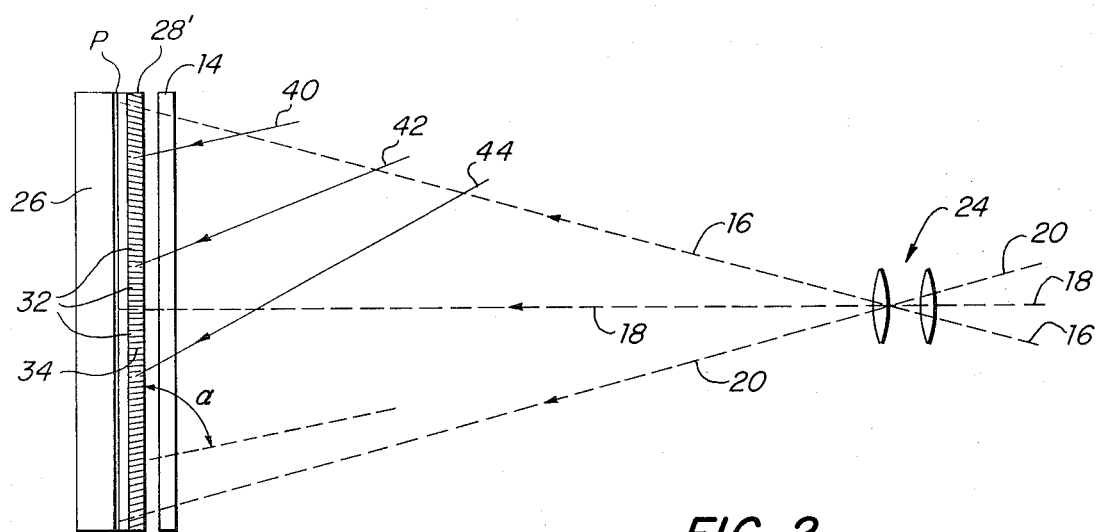
FIG. 2 is a diagrammatic view of a mechanical collimator used to select radiation after a predetermined number of reflections.

Selection means 28 may be a mechanical collimator 28', FIG. 2, formed of a plurality of slats 32 embedded in a transparent medium 34 such as the "Light Control Film" manufactured and sold by the 3M Company. In FIG. 2 the rays 16, 18 and 20 are shown unfolded and the highly folded optical system 10 is omitted, for clarity only, in order to facilitate understanding of the selector means, collimator 28'. The slat angle $\alpha$ is chosen to pass radiation such as rays 16, 18 and 20 and any other radiation approaching it at similar angles subsequent to the proper number of reflections and to block or absorb radiation coming in at any other angle, after any other number of reflections such as rays 40, 42, and 44. The disposition of slats 32 is such that at the center where ray 18 is incident the slats are parallel to ray 18. As the distance from ray 18 increases the angle of the slats 32 increases so that at their outer extremities the slats are able to transmit rays 16 and 20.

Figure 3:
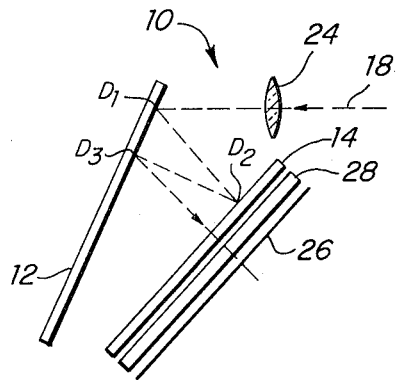
FIG. 3 is a schematic representation of one pattern of multiple reflections which may be obtained in the highly folded optical system in the camera according to this invention.
Figure 4:
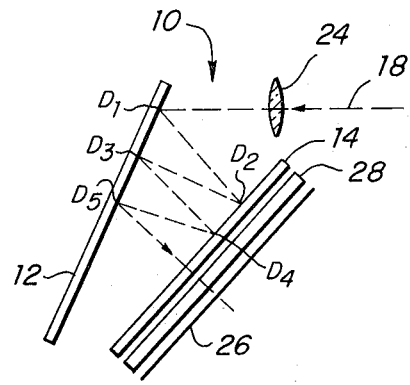
FIG. 4 is a schematic of another pattern of multiple reflections which may be obtained in the highly folded optical system in the camera according to this invention.

The incoming radiation from lens 24, FIG. 1, is reflected at least once from each of the mirrors and more typically at least once from one of the mirrors and twice from the other. Incoming radiation from lens 24 may be directed to either of the mirrors. For example, in FIG. 3 the rays, shown typified by ray 18, first reflect from mirror 12 at point $D_1$, then from mirror 14 at point $D_2$, then again from mirror 12 at point $D_3$ and is finally transmitted through partially reflecting mirror 14 and the selection means 28 to the film 26. Alternatively, as shown in FIG. 4, ray 18 may be reflected twice more, once at point $D_4$ on mirror 14 and again at $D_5$ on mirror 12 before it is transmitted by partially reflecting mirror 14 and selecting means 28 onto film 26.

Figure 5:
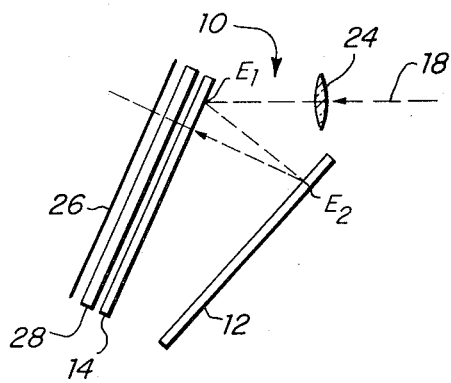
FIG. 5 is a schematic of another pattern of multiple reflections which may be obtained in the highly folded optical system in the camera according to this invention.
Figure 6:
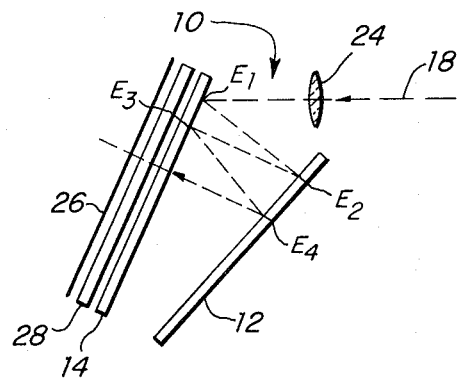
FIG. 6 is a schematic of another pattern of multiple reflections which may be obtained in the highly folded optical system in the camera according to this invention.

Although as illustrated so far the incoming radiation from lens 24 has been shown incident first on highly reflecting mirror 12 this is not a necessary limitation of the invention. For example in FIG. 5 the position of mirrors 12 and 14 have been interchanged and the selecting means 28 and the film 26 have been moved to remain in the same position relative to mirror 14. Ray 18 is directed by lens 24 first to partially reflecting mirror 14 where it is reflected at point $E_1$, and then to highly reflecting mirror 12 where it is reflected at point $E_2$, after which it is transmitted by the partially reflecting mirror 14 and selection means 28 to film 26. Alternatively, as shown in FIG. 6 the configuration of FIG. 5 is not limited to but two reflections, $E_1$ and $E_2$, as a further reflection $E_3$ at partially reflecting mirror 14 and another reflection $E_4$ at highly reflecting mirror 12 may be undergone before ray 18 is passed through partially reflecting mirror 14 and mechanical collimator 28 to film 26.

Figure 7:
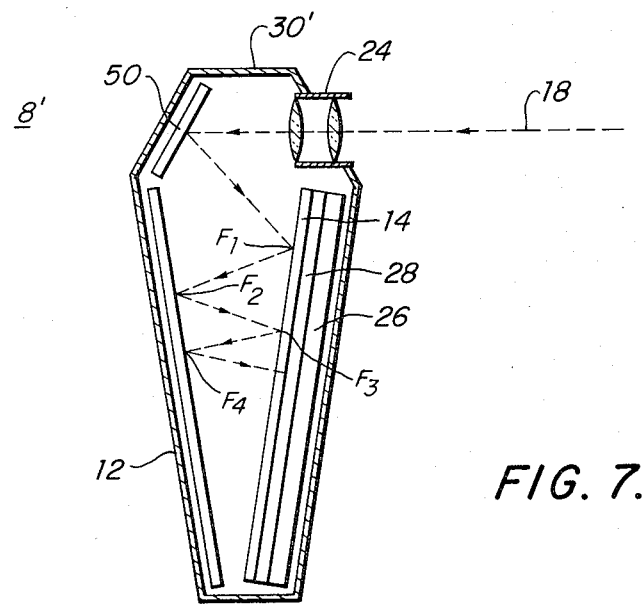
FIG. 7 is a diagrammatic side elevational view of an alternative arrangement of the camera according to this invention.

Although in the construction of camera 8 shown in FIG. 1 the radiation is directed directly from the camera lens to one of the two mirrors 12 and 14 this is not a necessary limitation of the invention. For, as shown in FIG. 7, a camera 8' may be constructed according to this invention which has a housing 30' which has a more utilitarian shape by providing a third deflecting means, mirror 50, to receive the light from lens 24 and reflect it to mirror 14. Although the radiation from lens 24 is reflected from mirror 50 directly to partially reflecting mirror 14 this is not a limitation of the embodiment shown in FIG. 7 as the radiation may be made to be first incident upon mirror 12 as indicated in the discussions of FIGS. 3–6. Also with respect to the embodiment of FIG. 7 and as indicated with respect to the discussion of FIGS. 3–6 the number of reflections is not limited to those shown, i.e. $F_1$, $F_2$, $F_3$ and $F_4$ as either a fewer number or a greater number of reflections could be used.

Other embodiments will occur to those skilled in the art and are within the following claims:

What is claimed is:

1. A compact camera having a highly folded optical system comprising:
   first reflecting means;
   second reflecting means disposed at a first angle to said first reflecting means, one of said first and second reflecting means being partially reflective, the film plane of the camera being proximate the one of said reflecting means which is partially reflective and being on the side opposite the other reflecting means;

means for directing radiation from an object to be photographed to one of said reflecting means at a second angle to produce multiple reflections between said first and second reflecting means; and selecting means proximate the one of said reflecting means which is partially reflecting for selecting radiation which is incident at predetermined angles determined by multiple reflections between said first and second reflecting means for exposing film at the film plane.

2. The camera of claim 1 in which said means for directing includes a lens.

3. The camera of claim 2 in which said means for directing further includes means for deflecting radiation from said lens to one of said first and second reflecting means.

4. The camera of claim 3 in which said selecting means includes a mechanical collimator.

5. The camera of claim 1 in which said first and second reflecting means are planar.

6. The camera of claim 3 in which said deflecting means is a planar reflector.

7. The camera of claim 1 in which the radiation is directed first to said one of said first and second reflecting means which is partially reflective.

8. The camera of claim 1 in which said radiation is reflected at least once from each of said first and second reflecting means.

9. A compact camera having a highly folded optical system comprising:

first reflecting means;

second reflecting means disposed at a first angle to said first reflecting means, one of said first and second reflecting means being partially reflective, the film plane of the camera being proximate the one of said reflecting means which is partially reflective and being on the side opposite the other reflecting means;

means for directing radiation from an object to be photographed to one of said reflecting means at a second angle to produce at least one reflection from each of said first and second reflecting means, and then transmission through the one of said reflecting means at which the first reflection occurred; and selecting means between said film plane and the one of said reflecting means which is partially reflecting for selecting radiation which is incident at predetermined angles determined by the multiple reflections between said first and second reflecting means for exposing film at the film plane.

* * * * *